United States Patent [19]

Kawakami

[11] Patent Number: 5,155,752
[45] Date of Patent: Oct. 13, 1992

[54] OUTPUT MONITORING CIRCUIT FOR A RADIATION GENERATOR APPARATUS

[75] Inventor: Hideyuki Kawakami, Amagasaki, Japan

[73] Assignee: Mitsubishi Denki Kabushiki Kaisha, Tokyo, Japan

[21] Appl. No.: 691,523

[22] Filed: Apr. 25, 1991

[30] Foreign Application Priority Data

Apr. 26, 1990 [JP] Japan ................................. 2-108636

[51] Int. Cl.$^5$ .............................................. H05G 1/42
[52] U.S. Cl. ...................................... 378/97; 378/108; 378/207
[58] Field of Search ...................... 378/207, 97, 98, 96, 378/108, 101, 111, 112, 116

[56] References Cited

U.S. PATENT DOCUMENTS

| 3,975,640 | 8/1976 | Boux et al. | 250/385.1 |
| 4,035,645 | 7/1977 | Meyer | 378/97 |
| 4,250,103 | 2/1981 | Vatne et al. | 378/97 |

Primary Examiner—Janice A. Howell
Assistant Examiner—Don Wong
Attorney, Agent, or Firm—Rothwell, Figg, Ernst & Kurz

[57] ABSTRACT

An output monitoring circuit for a radiation generator apparatus includes a pulse integrator circuit 37 for integrating each pulse of the output of the detector 10 supplied via a pulse amplifier 36. Further, a triangular waveform generator 34 outputs a sawtooth waveform E which is reset to the ground level at each rising edge of the trigger pulses D generated by the pulse trigger generating circuit 1 for the radiation generator apparatus, and a sample hold circuit 35 holds each peak value of the waveform E of the triangular waveform generator 34 and outputs waveform F the level of which is proportional to the pulse repetition period of the pulses of the detector 10. A divider circuit 39, having a numerator input coupled via an amplifier 38 to the pulse integrator circuit 37 and a denominator input coupled to the sample hold circuit 35, outputs a signal the level of which corresponds to the temporal average of the intensity of the radiation pulses generated by the radiation generator apparatus. The output of the divider circuit 39 is displayed via a radiation output intensity display 20 and is supplied to an integrating counter 42 via a voltage frequency converter 40 and frequency divider 41. The output of the divider circuit 39 is also fed back to the control unit 32 for controlling the radiation generation.

6 Claims, 4 Drawing Sheets

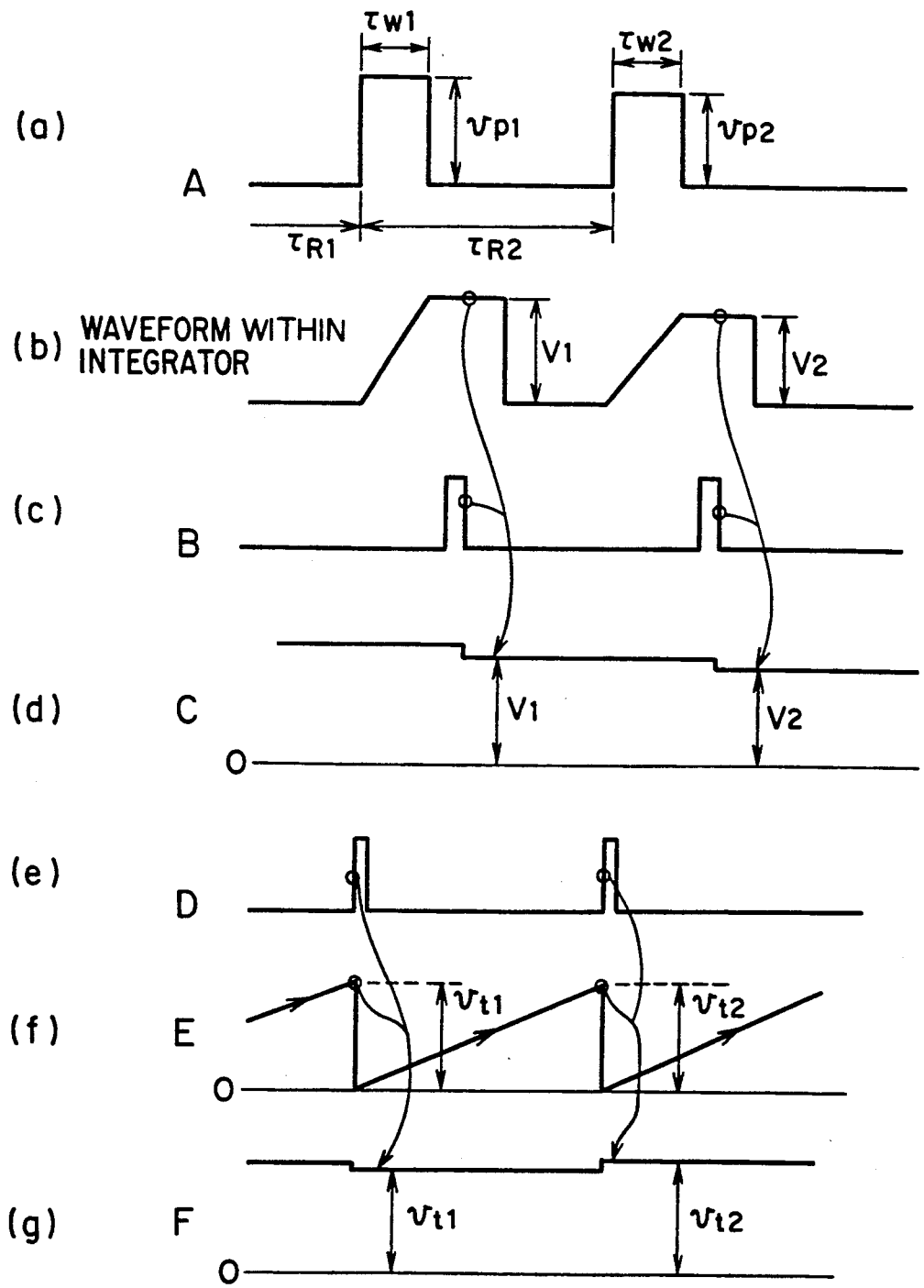

OUTPUT MONITORING CIRCUIT FOR A RADIATION GENERATOR APPARATUS

BACKGROUND OF THE INVENTION

This invention relates to radiation generator apparatuses for medical equipment, and more particularly to the output monitoring circuits for the radiation generator apparatuses.

FIG. 1 is a block diagram showing the organization of a conventional radiation generator device, which is disclosed, for example, in Japanese Laid-Open Patent (Kokai) No. 55-133800. In FIG. 1, the circuit for an electron gun 6 and an accelerator 7 of the radiation generator apparatus includes: a pulse trigger generating circuit 1; a high-voltage pulse modulator 2 coupled to the pulse trigger generating circuit 1; a pulse transformer 3 for the electron gun 6 coupled to the high-voltage pulse modulator 2; a pulse transformer 4 coupled to the high-voltage pulse modulator 2; a high-power microwave generator 5 for the accelerator 7 coupled to the pulse transformer 4. The electron beam generated by the electron gun 6 via the output of the pulse transformer 3 is accelerated within the accelerator 7 via the microwave generated by the high-power microwave generator 5, and is deflected by a deflecting system 8 to hit on a x-ray radiation generating mechanism 9, to generate x-ray radiation.

The radiation detected by a radiation monitor or detector 10 is converted into a corresponding voltage via an amplifier 11 and is supplied to an output stabilizer circuit 12 together with the output of an output setting mechanism 13. The output of the detector 10 is also supplied via the amplifier 11 to a radiation output intensity display 20 and an integrator circuit 21, the output of which is displayed by a radiation amount display 22; and to an interlocking circuit including: a divider circuit 14, an upper bound setter 15, a lower bound setter 16, a comparator 17, another comparator 18, an AND circuit 19, an integral radiation setting mechanism 23 for setting the integral or cumulative amount of radiation, a comparator 24 for determining whether the output of the integrator circuit 21 has exceeded the value set via the integral radiation setting mechanism 23, a time setting mechanism 25 for setting the maximum duration of radiation generation, a switch mechanism 26 for effecting on/off of the radiation generation, a timer mechanism 27 for measuring the time beginning with the radiation generation, a time display 28 for displaying the duration of radiation generation, a comparator 29, an AND circuit 30, another AND circuit 31, a control unit 32 for controlling the on/off of radiation generation, and a reset mechanism 33 which, although the connection to other parts are not shown, resets the displays 22 and 28 and, if the values of the previous radiation generation are held in the integrator circuit 21 and the time display 28, the integrator circuit 21 and the time display 28, at the start of radiation generation.

The comparator 24 outputs a logical "1" when the output of the integrator circuit 21 is not greater than the value that is set via the integral radiation setting mechanism 23, and outputs a logical "0" when the output of the integrator circuit 21 exceeds the set value. The comparator 29 outputs a logical "1" when the output of the timer mechanism 27 is not greater than the value set via the time setting mechanism 25, and outputs a logical "0" when the output of the timer mechanism 27 exceeds the set value. The switch mechanism 26 outputs logical "1" upon commencement of radiation generation, to start the timer mechanism 27. The AND circuit 30 outputs the AND or logical product of the outputs of the comparator 24, the comparator 29 and the switch mechanism 26.

The comparator 17 outputs a logical "1" when the output of the divider circuit 14 is less than the value set via the upper bound setter 15, and otherwise a logical "0". The comparator 18 outputs a logical "1" when the output of the divider circuit 14 is greater than the value set via the lower bound setter 16, and otherwise a logical "0". The AND circuit 19 outputs the AND or logical product of the outputs of the comparators 17 and 18. The ON gate of the control unit 32 is opened (i.e., turned on) via the output of the AND circuit 31 taking the logical product of the outputs of the AND circuit 19 and the AND circuit 30.

FIG. 2 shows the waveform of the pulse current signal generated by the detector of FIG. 1. When the radiation from the x-ray radiation generating mechanism 9 hits on the detector 10, an ionization current having the waveform shown in FIG. 2 is generated, where: $\tau_W$ represents pulse width; $i_p$ represents peak value; and $\tau_R$ represents the pulse repetition period.

The amplifier 11 integrates the pulse current signal of FIG. 2 and converts it into corresponding voltage signal. The temporal average value $I_{ave}$ of the pulse waveform of FIG. 2 is represented by:

$$I_{ave} = i_P \tau_W / \tau_R \tag{1}$$

Usually, not the instantaneous but the temporal average rate of the output radiation intensity must be monitored. Thus, the waveform of FIG. 2 is fed into the integrator circuit of FIG. 3 having an integration time constant equal to RC. The average output $V_{Oave}$ of the circuit of FIG. 3 is represented by:

$$V_{Oave} = -R \cdot I_{ave} \tag{2}$$

However, since the input to the circuit of FIG. 3 has a pulse waveform of FIG. 2, the transient or temporal variation of the output of the circuit of FIG. 3 is represented by:

$$V_O(t) = -R \cdot i_P \cdot C \cdot e^{-(t-\tau W)/RC} \tag{3}$$

provided that $$\tau_W << RC.$$

Thus, the output of the circuit of FIG. 3 fluctuates with a ripple $\Delta V$, the value of which becomes greater as the repetition period of the pulse signal increases.

The above radiation generator apparatus thus has the following disadvantage.

The radiation monitoring output of the circuit of FIG. 3 is utilized, not only for the observation of the output power, but also for the output stabilization and smoothing control and for the interlocking safety circuit. Thus, when the ripple $\Delta V$ becomes great, the operation of the control circuit may become unstable due to hunting or the operation of the interlocking circuit may fail. Further, the monitoring meters are hard to read due to hunting of the readings.

SUMMARY OF THE INVENTION

It is therefore an object of this invention to provide a simple and reliable output monitoring circuit for a radiation generator apparatus which is capable of removing the ripple components from the radiation output monitoring signal.

The above objects are accomplished in accordance with the principle of this invention by an output monitoring circuit for a radiation generator apparatus which generates radiation pulses, said output monitoring circuit comprising: a detector for detecting radiation pulses generated by said radiation generator apparatus, said detector outputting pulses corresponding to the radiation pulses; pulse integrator circuit means, coupled to the detector, for integrating each pulse outputted from the detector, said pulse integrator circuit outputting a signal having a level corresponding to an integral of a preceding pulse of the detector; pulse repetition period measurement means for outputting a signal having a level corresponding to a preceding pulse repetition period of the pulses of the detector; and a divider circuit having a numerator and a denominator input coupled to said pulse integrator circuit means and said pulse period measurement circuit means, respectively, said divider circuit thereby outputting a signal a level which is proportional to a temporal average intensity of the radiation pulses.

BRIEF DESCRIPTION OF THE DRAWINGS

The features which are believed to be characteristic of this invention are set forth with particularly in the appended claims. The structure and method of operation of this invention itself, however, will be best understood from the following detailed description, taken in conjunction with the accompanying drawings, in which:

FIG. 6 is a timing chart showing the timings of various waveforms generated in the circuit of FIG. 5.

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

Figure 1:
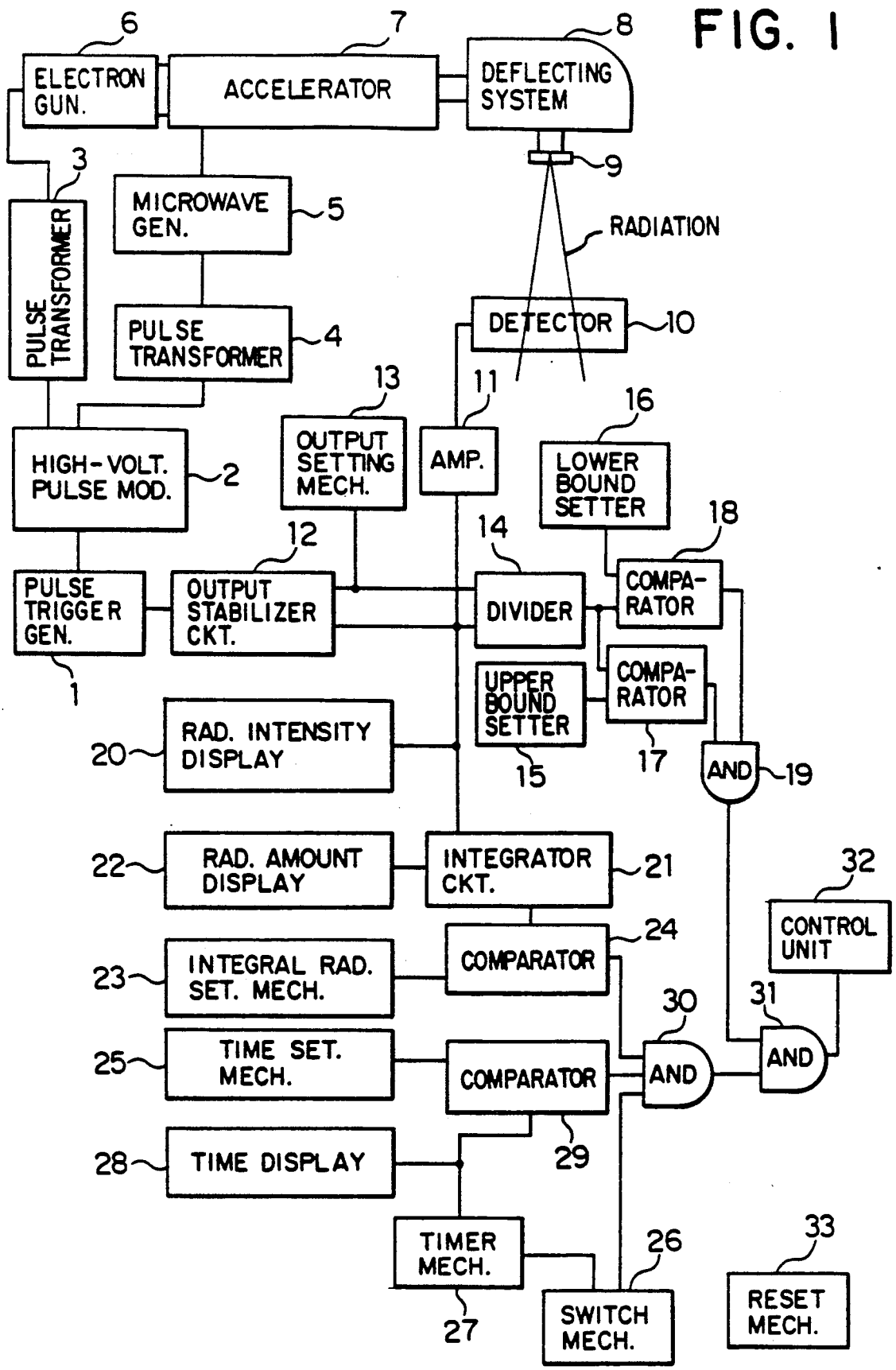
FIG. 1 is a block diagram showing the organization of a conventional radiation generator device.
Figure 2:
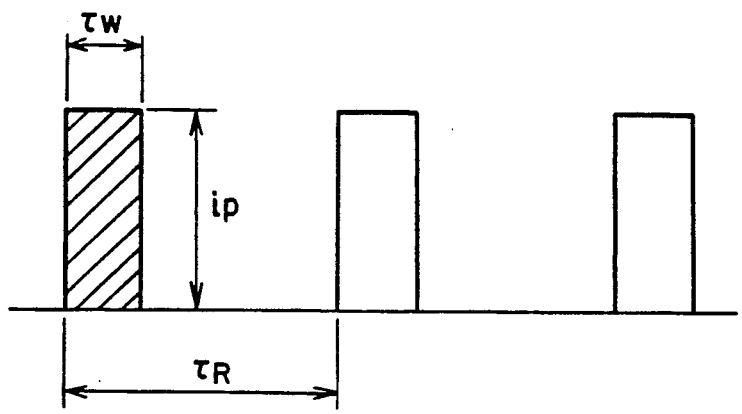
FIG. 2 shows the waveform of the pulse current signal generated by the detector of FIG. 1.
Figure 3:
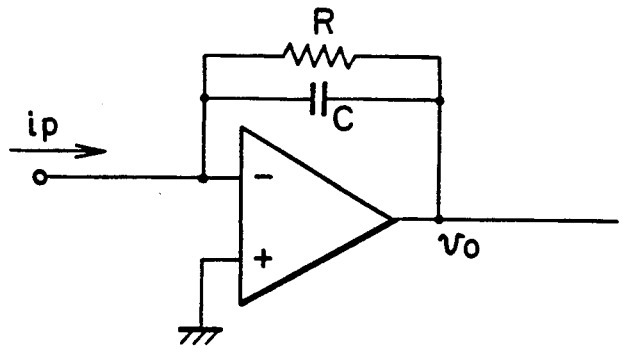
FIG. 3 is a circuit diagram showing the circuit for integrating the pulse current signal of FIG. 2 and converting it into a corresponding voltage signal.
Figure 4:
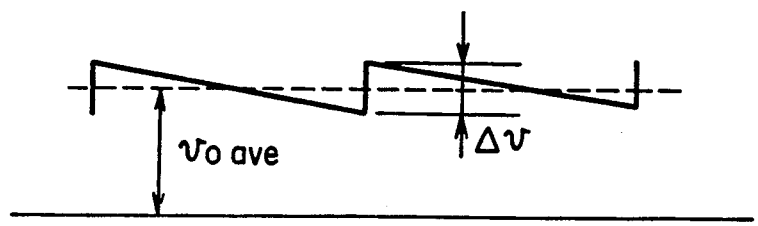
FIG. 4 shows the waveform of the output of the circuit of FIG. 3.
Figure 5:
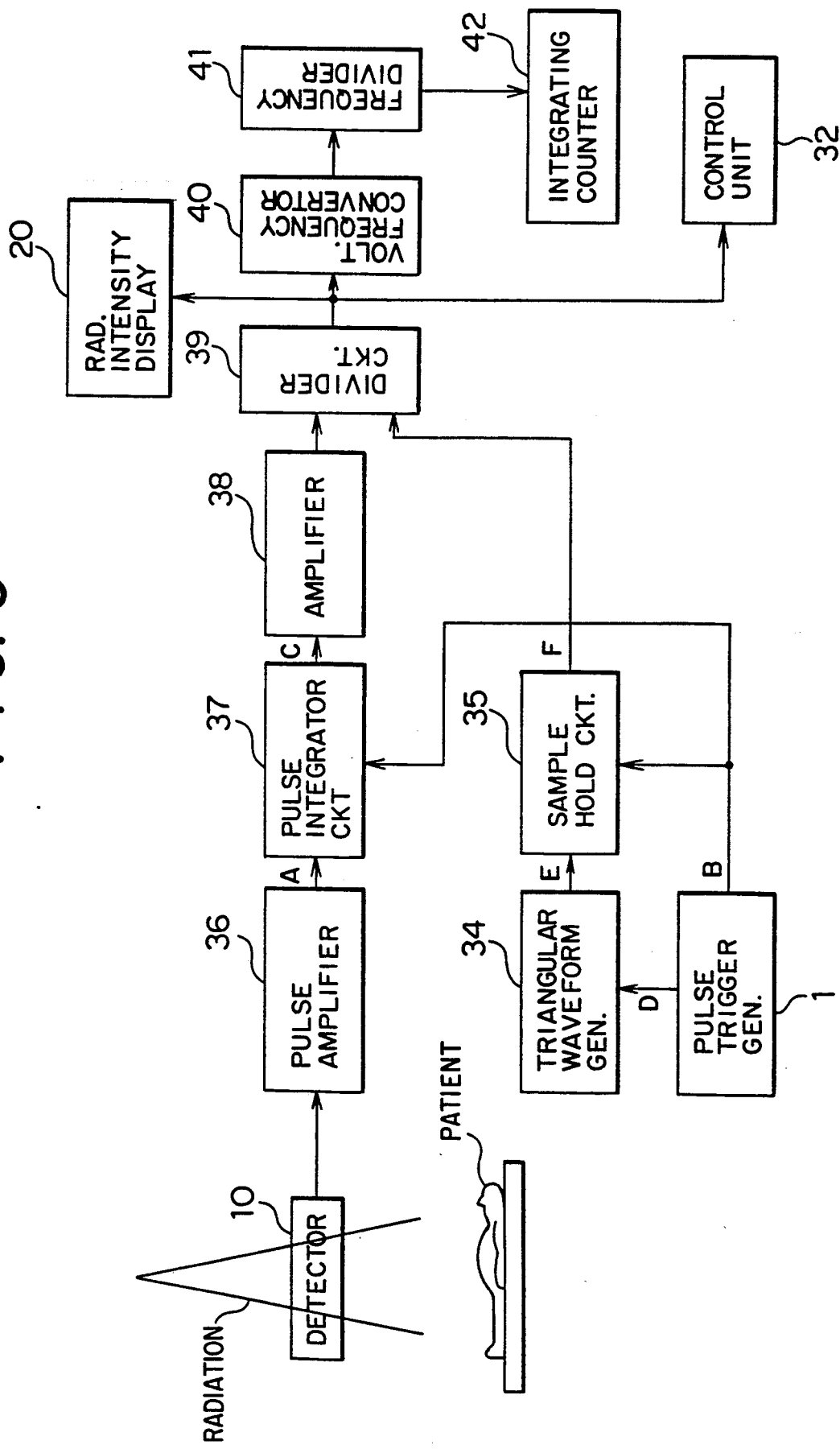
FIG. 5 is a block diagram showing the organization of a radiation generator apparatus according to an embodiment of this invention.

FIG. 5 is a block diagram showing the organization of a radiation generator apparatus according to an embodiment of this invention. In FIG. 5, the pulse trigger generating circuit 1, the detector 10, the radiation output intensity display 20, and the control unit 32 are identical to those of the above conventional radiation generator apparatus. In addition, the radiation generator apparatus of FIG. 5 includes: a triangular waveform generator 34 coupled to the pulse trigger generating circuit 1; a sample hold circuit 35 coupled to the pulse trigger generating circuit 1 and the triangular waveform generator 34; a pulse amplifier 36 coupled to the detector 10; a pulse integrator circuit 37 coupled to the pulse amplifier 36 and the pulse trigger generating circuit 1; an amplifier 38 coupled to the pulse integrator circuit 37; a divider circuit 39 coupled to the sample hold circuit 35 and the amplifier 38; a voltage frequency converter 40 coupled to the divider circuit 39; a frequency divider 41 coupled to the voltage frequency converter 40; and an integrating counter 42 coupled to the frequency divider 41. The radiation output intensity display 20 (which usually consists of an ammeter) and the control unit 32 are coupled to the output of the divider circuit 39.

The radiation pulse signal from the detector 10 is processed according to this invention by means of the circuit 1 and circuits 34 through 39, such that the output of the divider circuit 39 constitutes a temporal average rate of the pulse signal of the detector 10. The details of the method of operation is described by reference to FIG. 6.

FIG. 6 is a timing chart showing the timings of various waveforms generated in the circuit of FIG. 5. The reference characters at the right of the waveforms correspond to those in FIG. 5.

The output A of the pulse amplifier 36 consists of a pulse train the frequency and magnitude of which vary from time to time. Thus, the pulse width $\tau_W$, the peak voltage $v_p$, and the pulse repetition period $\tau_R$ of the output a of the pulse amplifier 36 may change with time. The output A of the pulse amplifier 36 is integrated within the pulse integrator circuit 37, such that the waveform within the pulse integrator circuit 37, represented at (b) in FIG. 6, rises, after each one of the pulses of waveform A, to a height equal to the pulse width $\tau_W$ times the pulse height $v_p$ of the pulse of the waveform A, to return to the ground level after a predetermined interval which is substantially less than the pulse repetition period $\tau_R$ minus the pulse width $\tau_W$ of the waveform A. Thus, the height $V_1$ and $V_2$ of the waveform at (b) is equal to $\tau_{W1} \cdot v_{p1}$ and $\tau_{W2} \cdot v_{p2}$, respectively. The pulse trigger generating circuit 1 generates pulse signals B and D. The pulses of the signal D are generated in synchronism with the rising edges of the waveform A, and the those of the signal B are delayed by a predetermined interval after the pulses of D. In response to the trigger pulses B from the pulse trigger generating circuit 1, the pulse integrator circuit 37 holds the peak value of the waveform therewithin shown at (b) in FIG. 6, to output the peak value C therefrom. The level of this signal C is equal to the integral of the preceding pulse of the waveform A. Thus, in FIG. 6, the levels $V_1$ and $V_2$ of the waveform C are:

$$V_1 = \tau_{W1} \cdot v_{p1}$$

$$V_2 = \tau_{W2} \cdot v_{p2} \quad (4)$$

The level of the output C of the pulse integrator circuit 37 is equal to the instantaneous output intensity of radiation. Thus, to obtain the temporal average output intensity of radiation, it is necessary to divide the level of the output C by a value equal to the current pulse repetition period $\tau_R$. This is effected as follows.

In response to the pulse trigger signal D from the pulse trigger generating circuit 1, the triangular waveform generator 34 generates a sawtooth or triangular waveform E, which is reset to the ground level at the rising edge of each trigger pulse D to increase at a predetermined fixed rate. Thus, each peak height of the sawtooth waveform E is proportional to the preceding pulse repetition period:

$$v_{t1} = k \cdot \tau_{R1}$$

$$v_{t2} = k \cdot \tau_{R2} \quad (5)$$

where k is a proportionality constant.

Each peak level $v_t$ of the output E of the triangular waveform generator 34 is held by the sample hold circuit 35, the output F of which is thus proportional to the preceding pulse repetition period of the waveform A.

The output C of the pulse integrator circuit 37 is inputted via an amplifier 38 to the divider circuit 39 as the numerator input, while the output F of the sample hold circuit 35 is inputted to the amplifier 38 as the denominator input. Thus, the divider circuit 39 outputs a signal the level of which, $V_a$, is expressed by the following equations:

$$V_a = \beta \cdot (\tau_W \cdot v_p / v_t) \quad (6)$$
$$= \beta/k \cdot (\tau_W \cdot v_p / \tau_R)$$

where $\beta$ is the gain of the divider circuit 39. Thus, the levels $V_{a1}$ and $V_{a2}$ of the output of the divider circuit 39 after the first and the second pulses of the output A in FIG. 6 is expressed by:

$$V_{a1} = \beta \cdot (\tau_{W1} \cdot v_{p1} / v_{t1}) \quad (6)'$$
$$= \beta/k \cdot (\tau_{W1} \cdot v_{p1} / \tau_{R1})$$

$$V_{a2} = \beta \cdot (\tau_{W2} \cdot v_{p2} / v_{t2})$$
$$= \beta/k \cdot (\tau_{W2} \cdot v_{p2} / \tau_{R2})$$

Thus, if the gain $\beta$ of the divider circuit 39 is set to satisfy: $\beta = k$, the equation (6) is equivalent to the equation (1) above, such that the output of the divider circuit 39 constitutes a voltage signal representing the temporal average radiation output without ripple components. It is to be noted that even in the region where the pulse repetition period is long (i.e., where the pulse repetition frequency is low), the output of the divider circuit 39 contains no ripple.

The output of the divider circuit 39 is inputted to the control unit 32 for controlling the generation of radiation of the radiation generator apparatus. Further, the output of the divider circuit 39 is inputted to the radiation output intensity display 20 which displays the average radiation intensity. In addition, the output of the control unit 32 is converted into a corresponding frequency signal via the voltage frequency converter 40, which frequency signal is divided via the frequency divider 41. The divided frequency signal of the frequency divider 41 is inputted to the integrating counter 42 which integrates it to obtain the integral or cumulative amount of radiation.

In the above embodiment, the pulse repetition period is detected by the triangular waveform generator 34 and the sample hold circuit 35. However, the triangular waveform generator 34 and the sample hold circuit 35 may by replaced by a high-resolution digital timer and a D/A converter.

What is claimed is:

1. An output monitoring circuit for a radiation generator apparatus which generates radiation pulses, said output monitoring apparatus comprising:
    a detector for detecting said radiation pulses and for outputting electrical pulses corresponding to the detected radiation pulses;
    pulse integrator means, coupled to said detector, for integrating each pulse outputted from the detector, said pulse integrator means outputting a signal having a level corresponding to an integral of the pulses outputted by said detector;
    pulse repetition period measurement means for outputting a signal having a level corresponding to a preceding pulse repetition period of the pulses outputted by said detector; and
    a divider circuit having a numerator and a denominator input coupled to said pulse integrator means and said pulse repetition period measurement means, respectively, said divider circuit outputting a signal having a level equal to the level of said pulse integrator means output signal divided by the level of said pulse repetition period measurement means output signal, which is proportional to a temporal average intensity of said radiation pulses.

2. An output monitoring circuit for a radiation generator apparatus as claimed in claim 1, further comprising: a pulse trigger generating circuit for generating first trigger pulses in response to which said radiation generator apparatus generates said pulses; wherein said pulse repetition period measurement means is coupled to an output of said pulse trigger generating circuit, and said pulse repetition period measurement means comprises: a triangular waveform generator for generating a triangular waveform which is reset to a ground level in response to each one of said first trigger pulses of said pulse trigger generating circuit to increase at a predetermined fixed rate thereafter; and a sample hold circuit for holding a preceding peak level of said triangular waveform generator which is proportional to a preceding pulse repetition period of the pulses of said detector.

3. An output monitoring circuit for a radiation generator apparatus as claimed in claim 2, wherein said pulse trigger generating circuit generates second trigger pulses that are delayed by a predetermined interval with respect to said first trigger pulses; and said pulse integrator circuit means holds a value of an integral of each pulse of said detector in response to said second trigger pulses generated by said pulse trigger generating circuit.

4. An output monitoring circuit for a radiation generator apparatus as claimed in claim 1, further comprising a radiation output intensity display coupled to an output of said divider circuit for displaying a temporal average intensity of radiation.

5. An output monitoring circuit for a radiation generator apparatus as claimed in claim 1, further comprising: a voltage frequency converter for converting an output of said divider circuit into a corresponding frequency signal; and an integrating counter for integrating an output of said voltage frequency converter to obtain an integral amount of radiation.

6. An output monitoring circuit for a radiation generator apparatus as claimed in claim 1, wherein an output of said divider circuit is supplied to a control unit of said radiation generator apparatus for controlling radiation.

* * * * *

UNITED STATES PATENT AND TRADEMARK OFFICE
CERTIFICATE OF CORRECTION

PATENT NO. : 5,155,752

DATED : October 13, 1992

INVENTOR(S) : Hideyuki Kawakami

It is certified that error appears in the above-indentified patent and that said Letters Patent is hereby corrected as shown below:

Column 3, line 32, delte "particularly", an insert --particularity --.

Column 4, line 30, change "a" to --A--.

Signed and Sealed this

Twenty-sixth Day of October, 1993

Attest:

BRUCE LEHMAN

Attesting Officer

Commissioner of Patents and Trademarks